United States Patent [19]
Sinopoli et al.

[11] Patent Number: 5,648,153
[45] Date of Patent: Jul. 15, 1997

[54] TIRES WITH HIGH STRENGTH REINFORCEMENT

[75] Inventors: Italo Marziale Sinopoli, Canton; Farrel Bruce Helfer; Dong Kwang Kim, both of Akron; John Gomer Morgan; Robert Martin Shemenski, both of North Canton, all of Ohio; Guy Jeanpierre, Bissen, Luxembourg; Gia Van Nguyen, Arlon, Belgium

[73] Assignee: The Goodyear Tire & Rubber Company, Akron, Ohio

[21] Appl. No.: 487,351

[22] Filed: Jun. 7, 1995

Related U.S. Application Data

[60] Division of Ser. No. 937,864, Oct. 13, 1992, which is a continuation-in-part of Ser. No. 496,759, Mar. 21, 1990, SIR No.H1333.

[51] Int. Cl.⁶ ........................ B60C 9/00
[52] U.S. Cl. ........................ 428/295.1
[58] Field of Search ............ 428/294, 295; 152/451, 527, 534, 535

[56] References Cited

U.S. PATENT DOCUMENTS

| | | | |
|---|---|---|---|
| 3,513,898 | 5/1970 | Lugli et al. | 152/526 |
| 3,607,592 | 9/1971 | Jenkins | 428/295 |
| 4,243,714 | 1/1981 | Vanassche et al. | 428/258 |
| 4,363,346 | 12/1982 | Pepe | 152/356 R |
| 4,399,187 | 8/1983 | Holroyd et al. | 428/295 |
| 4,408,444 | 10/1983 | Bailievier | 57/902 |
| 4,516,395 | 5/1985 | Palmer et al. | 57/237 |
| 4,586,324 | 5/1986 | Mizuma | 57/212 |
| 4,737,392 | 4/1988 | Dambre | 152/451 |
| 4,785,617 | 11/1988 | Bourgois et al. | 57/58.52 |
| 4,960,473 | 10/1990 | Kim et al. | 152/451 |
| 4,966,216 | 10/1990 | Kawasaki et al. | 152/556 |
| 5,188,685 | 2/1993 | Cherveny et al. | 152/527 |
| 5,242,001 | 9/1993 | Kahrs et al. | 152/527 |
| 5,318,643 | 6/1994 | Mizner et al. | 152/527 |
| 5,323,828 | 6/1994 | Kot et al. | 152/451 |

FOREIGN PATENT DOCUMENTS

| | | |
|---|---|---|
| A0237462 | 9/1987 | European Pat. Off. . |
| A0317636 | 5/1989 | European Pat. Off. . |
| A84845 | 6/1983 | Luxembourg . |

*Primary Examiner*—James J. Bell
*Attorney, Agent, or Firm*—T. P. Lewandowski

[57] ABSTRACT

Tires using high tensile reinforcement with values of at least 1240 N (280 lbs) for U+T type cord and at least 2000 N (450 lbs) for bunched type cord.

5 Claims, 4 Drawing Sheets

TIRES WITH HIGH STRENGTH REINFORCEMENT

This application is a Division of Ser. No. 07/937,864 filed Oct. 13, 1992 which is a CIP of copending U.S. application Ser. No. 07/496,759 filed Mar. 21, 1990, published Jul. 5, 1994 as SIR H 1333 and corresponds to PCT/US90/01906 filed Mar. 21, 1991. Assignee's U.S. Pat. No. 4,960,473 issued Oct. 2, 1990, discloses steel alloys for reinforcing wires/filaments for rubber products with increased strength and ductility and their process of manufacture which is hereby incorporated by reference thereto.

BACKGROUND OF THE INVENTION

The present invention relates to cord, cord reinforced plies and the radial tires for vehicles incorporating them. Radial tires are those tires wherein the cords of the carcass plies which extend from one bead to the other lie substantially on radial planes.

Particularly, the present invention relates to a cord reinforced composite having rubber where the structure is for tires and more particularly to a tire carcass or belt wherein at least one of two plies in the belt has the cords therein biased with respect to the direction of rotation of the tire.

Reinforced elastomeric articles are well known in the art for example for conveyor or like type belts, tires, etc. with cords of textile and/or fine steel wire, particularly belts for pneumatic tires with up to four layers with the cord reinforcement between adjacent layers being opposingly biased with respect to the direction of movement of the tire where it is desired to reinforce in the lateral direction in addition to the direction of rotation of the tire. Further, cords made of multi twisted filaments of fine wire with two or more filaments in a single strand construction having a wrap filament therearound to reinforce the above structure have also been known. More recently multi-strand cords such as 2+7×0.22+1 have been found necessary to meet the higher demand of fatigue life for composites in tire belts but are more expensive to make. Even more recently, there has been use of single strand cords of multi-filaments which are not twisted about each other but rather twisted altogether as a bundle or bunch to simplify the cord construction over multi-directional cords. Higher fatigue life requirements for composites in tires have resulted in cords with smaller filament diameter requiring more filaments in the cord to obtain the necessary strength.

Most recently two ply tire belts for light truck tires have been used having cords of 2+2×0.03 HT. An example of 2+2×0.30 HT cord is given in Assignee's prior U.S. Pat. No. 5,188,685 issued Feb. 23, 1993. These cords were made of high tensile (HT) steel of a carbon content by weight greater than 0.80% which was of a lesser strength than the above steel alloys which will be referred to herein as super tensile (ST).

Many problems have had to be overcome even after development of the above steel alloys and filaments. The higher strength steel alloys resulted in changes in cord modulus giving rise to the possibility of adjusting the parameters of a tire belt gross load which depend upon three factors assuming adequate cord to rubber adhesion. The factors are cord modulus, the ratio of cord volume to rubber volume which is often expressed as the number of cord ends per inch, and the angle of cord reinforcement. As further previously noted, as the angle of cord reinforcement approaches the direction of rotation of the tire the support from the reinforcement in the lateral direction moves toward zero. An increase in the above-mentioned two other cord related factors generally results in an increase of weight for the belt. Added weight means added cost and higher rolling resistance of a tire. Lighter cords with a lower modulus do not solve the problem because even though they have lower weight they also have a lower cord modulus which must be offset by increasing the ratio of cord to rubber volume. This increase in cord volume is limited by the physical size of the cord and the resulting spacing between the cords which governs the ability of the rubber to penetrate between the cords for good cord to rubber adhesion.

A challenge was to determine cord structure which could take advantage of the new cord modulus while not adversely affecting cord volume to rubber volume ratio on lateral reinforcement.

After considerable study, effort, testing and time, the present invention provided cords for truck tire Load Ranges E, F, G, H and J which substantially reduced the number of filaments for these Load Ranges. While a reduction in the number of filaments would lead one to expect a reduction in weight, this would not necessarily be the case where the filament size was increased. Under such circumstances, cord was found for use in the Load Ranges by varying the ends per inch (EPI) in the layers of the belt. More particularly, a single type of cord was found for use across the Load Ranges F–J. Other advantages which exist in the present invention include improved rolling resistance in at least one instance and a reduction in the cord gum coat gauge between the cord layers in the belt in another instance. A weight reduction due to reduction in weight of reinforcement as well as reduction in an amount of gum gauge also result in a reduction in cost for a tire of the present invention. Further, the new belt structure gives better rolling resistance perhaps because of the higher stiffness of the new cord over the old cord being used for reinforcement in the belt structure.

SUMMARY OF THE INVENTION

As indicated below, the present invention will be shown to have substantially maintained the gross load for a tire belt while reducing weight and cost using stronger filament in cord constructions not useable previously, in many instances even with high tensile filaments, and accompanying cord volumes and angles which reduce material in the tire. Similar advantages can be and have been achieved with carcass plies as well. Where high tensile cord is strong enough to meet the strength limitations herein, it as well as any other candidate meeting the strength requirements fall within this aspect of the invention.

Most particularly, for tire belts for radial medium truck tires having four layers of reinforcement a single type of cord was found for use across the Load Ranges F–J using a single filament size. Belts of this type have a belt inch strength equal or greater than control but with less reinforcement due to higher cord break strength. While cords made of super tensile filament meet the above cord strength requirement, other filaments having the required strength are within the invention of this type belt, even those high tensile cords meeting strength limit.

This invention provides a pneumatic radial tire with a carcass having radial cords and two sidewalls spaced apart a distance which in the axial direction determines the width of the tire section. The tire has two beads each one of which around which are turned up, from the inside toward the outside, the ends of the cords of the carcass. A tread is disposed on the crown of the carcass, and a belt structure that is circumferentially inextensible is interposed between the tread and the carcass. The belt structure has a width that is substantially equal to that of the tread and has two radially overlapped layers of elastomeric fabric reinforced with metallic cords. The metallic cords are parallel to each other in each layer and crossed with the cords of the facing layer and inclined at an angle of between 19° and 66° with respect to the equatorial plane of the tire. The inch strengths used in truck tires to obtain proper strength for a belt structure are different for varying load ranges as follows:

|  | Min. Inch Strength |
|---|---|
| LR F and G | 4608 |
| LR H | 6144 |
| LR J | 7000 |

The above inch strengths are achieved by the combination of cord strength and number of cords in a given width of a belt structure layer. Thus, the higher the cord strength the lower the number of ends that need to be in a layer to meet the required inch strength thereby lowering the belt weight.

For super tensile steel filaments of 0.35 MM diameter the filament break load is defined by the equation:

$$FBL = 720.4D^2 - 352.6D^3$$

where:
FBL is in pounds
D is the filament diameter in MM
For a 0.35 MM super tensile filament, the $$\begin{aligned} FBL &= 720.4 \times (0.35)^2 - 352.6 \times (0.35)^3 \\ &= 72.9 \text{ lbs} \end{aligned}$$

This value of 72.9 lbs for an 0.35 MM super tensile filament is referred to in Table 1 below which also shows the relationship between high tensile and super tensile filament breaking load.

An example of how the higher filament tensile strength obtained by super tensile steel was used to better achieve the inch strength requirements of all load ranges will be found below: For LR F and G:

A - $BIS=4608=$Cord strength $X\ EPI$

| B - Cord strength | = FBL × N × CE |
|---|---|
|  | = $(7.20.4\ D^2 - 352.6\ D^3) \times N \times CE$ | where:
D=diameter in MM
N=number of filaments
CE=cord efficiency
EPI=end per inch C - $BIS=4608=(720.4D^2-352.6D^3)N \times CE \times EPI$ Equation C shows that the proper inch strength can be obtained by using the right combination of filament diameter, number of filaments and ends per inch taking into account the cord efficiency. For a filament size of 0.35 MM, 4 filaments, cord efficiency of 97% a cord such as 2+2×0.35 would yield an average cord breaking load of:

$$CBL=72.9 \times 4 \times 0.97=283 \text{ lbs}$$

or a minimum break load of 268 lbs. Therefore a load range F and G tire would require 17.5 ends per inch of 2+2×0.35 super tensile cord to achieve the belt inch strength requirement:

$$BIS=17.5 \times 268=4608 \text{ lbs/inch}$$

Tires featuring 2+2×0.35 super tensile at 17.5 EPI in belts 2 and 3 are built and presented herein. If the strength of the filament was not super tensile such a construction could not have been possible without violating the minimum rivet requirement of 0.018".

A similar analysis with other load ranges determined that the best combination of filament sizes, numbers per cord, and ends per inch are as outlined in Tables 12 and 13 below.

Further, this invention provides a pneumatic radial tire with a carcass having radial cords and two sidewalls spaced apart a distance which in the axial direction determines the width of the tire section. The tire has two beads each one of which around which are turned up, from the inside toward the outside, the ends of the cords of the carcass. A tread is disposed on the crown of the carcass, and a belt structure that is circumferentially inextensible is interposed between the tread and the carcass. The belt structure has a width that is substantially equal to that of the tread and has four radially overlapped layers of elastomeric fabric reinforced with metallic cords. The metallic cords are parallel to each other within each layer and inclined at an angle of between 19° and 66° with respect to the equatorial plane of the tire. The belt structure has U+T type cord structure with a cord break load of at least 1240 N(280 lbs) for at least two of the belts making the belt structure suitable for Load Ranges F through J.

Super tensile cords of more than 6 filaments have also been developed and in some case the previous construction, whether normal or high tensile cord, has been simplified by reducing the number of filaments in the super tensile cord.

Lastly, this invention provides a pneumatic radial tire with a carcass having radial cords and two sidewalls spaced apart a distance which in the axial direction determines the width of the tire section. The tire has two beads each, one of which around which are turned up, from the inside toward the outside, the ends of the cords of the carcass. A tread is disposed on the crown of the carcass, and a belt structure that is circumferentially inextensible is interposed between the tread and the carcass. The belt structure has a width that is substantially equal to that of the tread and has four radially overlapped layers of elastomeric fabric reinforced with metallic cords. The metallic cords are parallel to each other within each layer and inclined at an angle of between 19° and 66° with respect to the equatorial plane of the tire. The belt structure has a bunched type cord structure with a cord break load of at least 2000 N(450 lbs) for at least two of the belts making the belt structure suitable for Load Range F through J.

The super tensile cords have the advantages of a 7 to 9% increase in cord break load over a predecessor cord made of high tensile steel. Those cords having a smaller cord diameter over previously used cord in a reinforcement of at least one layer of belt or ply of the present invention results in less rubber gauge being used where a comparable thickness of rubber is laid on each side of the reinforcing cord upon calendering. A smaller diameter cord results in less weight in the reinforcement resulting in lower rolling resistance for a tire thereby reinforced.

Further, all of the above cords result in lower linear density in the reinforcement for which they are used which again results in less weight and lower cost for the reinforcement and its tire.

BRIEF DESCRIPTION OF THE DRAWING

The above advantages of the invention will become readily apparent to one skilled in the art from reading the following detailed description of an embodiment of the invention when considered in the light of the accompanying drawings in which.

DEFINITIONS

As used herein and in the Claims:

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two layers or plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Cord" means one or more of the reinforcement elements, formed by one or more filaments/wires which may or may not be twisted or otherwise formed which may further include strands so formed which strands may or may not be also so formed, of which the plies in the tire are comprised.

"Crown" means that portion of the tire within the width limits of the tire tread.

"Density" means quantity per unit length.

"Equatorial plane (EP)" means the plane perpendicular to the tire's axis of rotation and passing through the center of its tread.

"Gauge" means material thickness.

"Load Range" means load and inflation limits for a given tire used in a specific type of service as defined by tables in *The Tire and Rim Association, Inc.*, 1989 Year Book.

"Radial" and "radially" are used to mean directions radially toward or away from the axis of rotation of the tire.

"Rivet" means the open space between cords in a layer.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Stiffness Ratio" means the value of the control belt structure stiffness divided into the value of another belt structure when the values are determined by a fixed three (3) point bending test having both ends of the cord fixed and flexed by a load centered between the fixed ends.

"Super Tensile Steel" (ST) means a steel as defined in the above referenced U.S. Pat. No. 4,460,473, or a tensile strength of at least $TS=K_1-K_2D$ where $K_1=4080$ N/MM$^2$, $K_2=2000$ N/MM$^2$ and D is the filament diameter in MM.

"Tread" means that portion of a tire that comes into contact with the road when the tire is normally inflated and under normal load.

DESCRIPTION OF THE PREFERRED EMBODIMENTS

Figure 1:
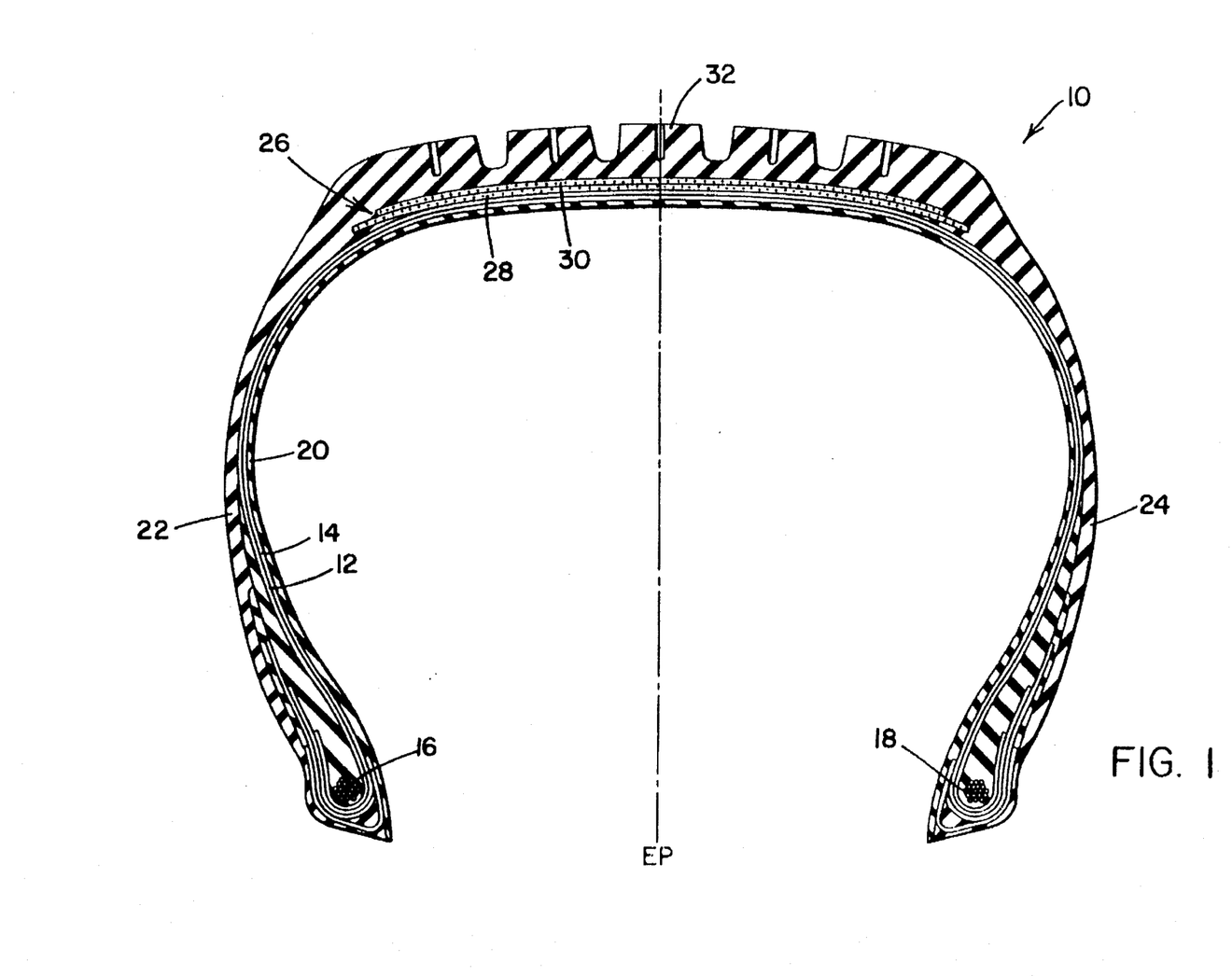
FIGS. 1 and 2 illustrate tire sections having composite structures according to the present invention.
Figure 2:
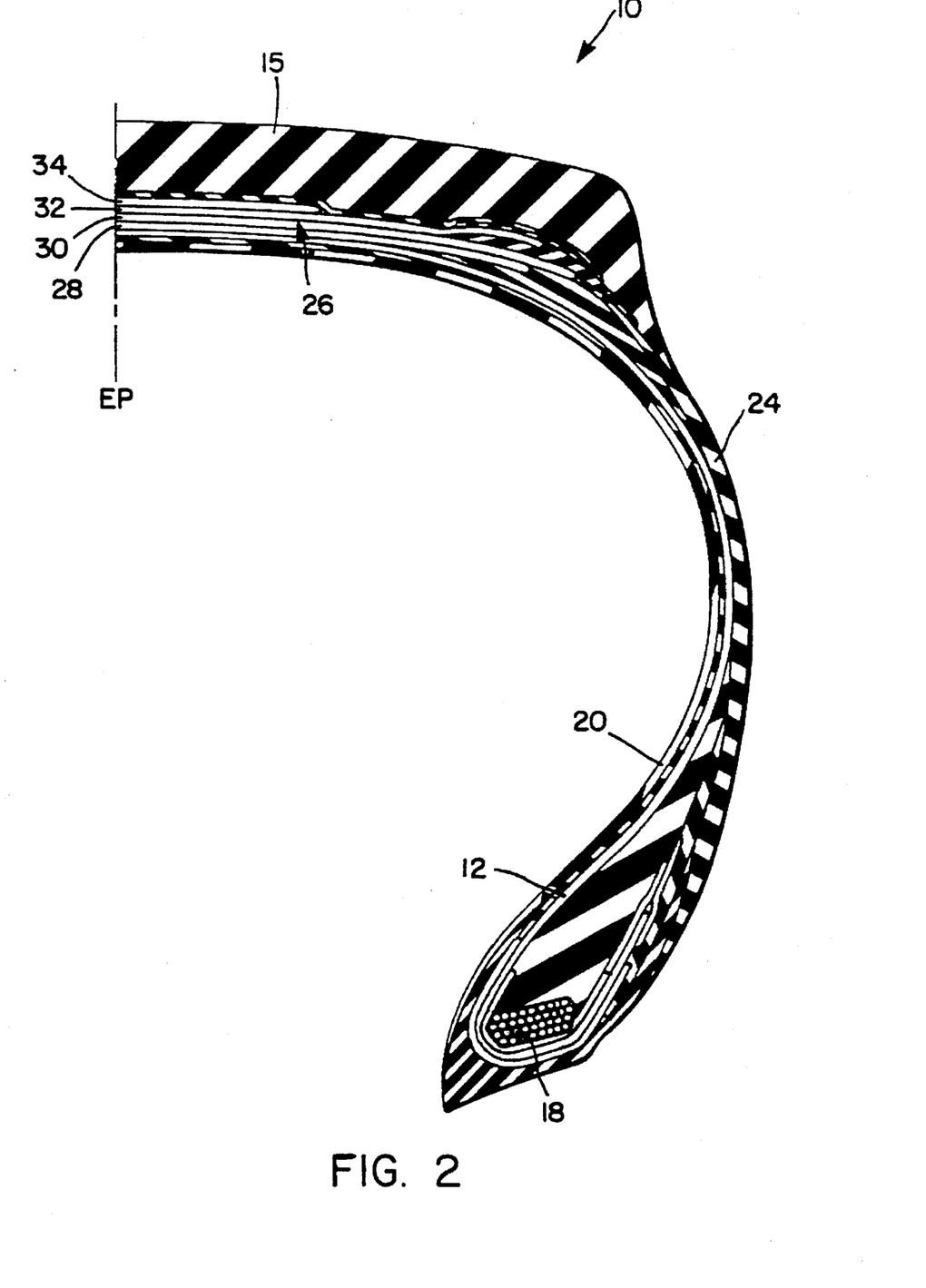

Referring to FIGS. 1 and 2 of the drawings, a ply 12 is shown within pneumatic tires 10 with a radial carcass wherein like elements have received like reference numerals. For the purposes of the present invention, a tire has a radial ply carcass structure when the cords of the carcass reinforcing ply, or plies 12,14 are oriented at angles in the range of 75° to 90° with respect to the equatorial plane (EP) of the tire.

The tires 10 have a pair of substantially inextensible annular beads 16,18 which are axially spaced apart from one another. Each of the beads 16,18 is located in a bead portion of the tires 10 which have exterior surfaces configured to be complimentary to the bead seats and retaining flanges of a rim (not shown) upon which the tires 10 are designed to be mounted. Plies may be of side-by-side reinforcing cords of polyester material, or of cord of the present invention and extend between the beads with an axially outer portion of the carcass structure folded about each of the beads 16,18. While in the embodiment of FIG. 1, the carcass ply structure comprises two plies 12,14 of reinforcing material, it is understood that one or more carcass plies of any suitable material may be employed in certain embodiments and one or more plies of reinforcement according to this invention may be used as well.

A layer of a low permeability material 20 may be disposed inwardly of the carcass plies 12,14 and contiguous to an inflation chamber defined by the volume bounded by the tire and rim assembly. Elastomeric sidewalls 22,24 are disposed axially outwardly of the carcass structure. A circumferentially extending belt structure 26 comprising in the embodiments shown two layers 28,30 (FIG. 1), or four layers 28,30,32,34 (FIG. 2), each of which preferably comprises steel reinforcing cords 36 (FIG. 3) is characterized by the cords 36 having filaments 38,40,42 and 44 with an average tensile strength of at least 3650 N/MM$^2$ at 0.20 MM filament size. While two and four layer belts are illustrated, other numbers are applicable as well.

Figure 4:
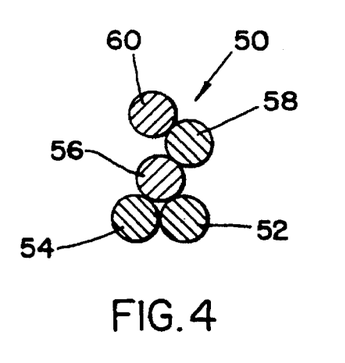
Figure 5:
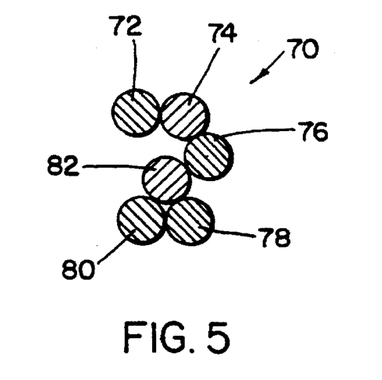
Figure 6:
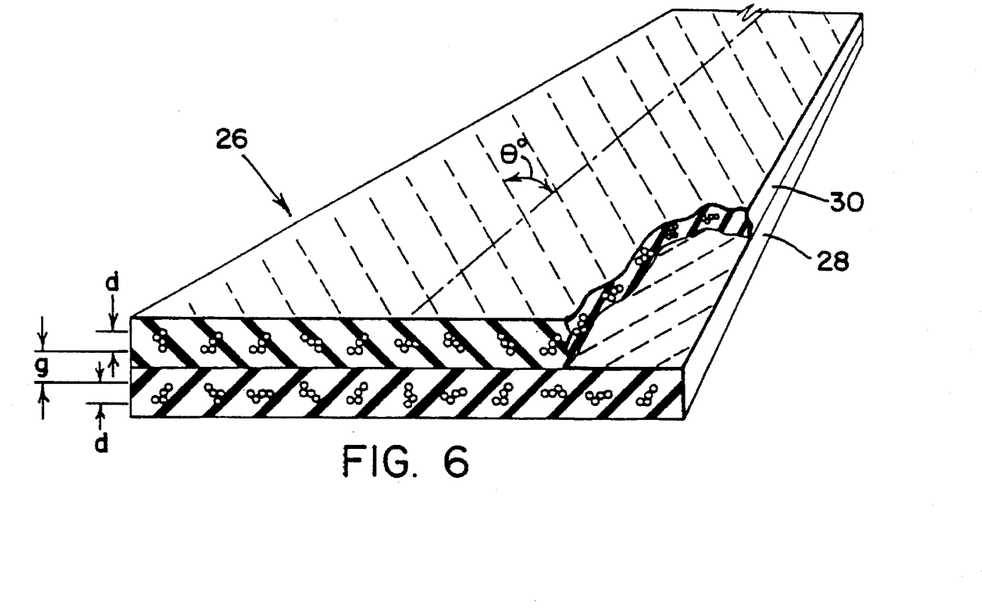
FIG. 6 is a schematic of a composite in accordance with the present invention.

FIG. 6 illustrates a composite 26, schematically, of the cord 36 in two layers, one layer 30 having an angle θ and the other layer 28 at an angle θ opposing that of layer 30 wherein the diameter d of the cord 36 effects the gauge g between the cords in the layers. FIGS. 4 and 5 illustrate alternate candidates for cords 50 and 70 of 2+3 and 3+3 construction, discussed below, with filaments 52–60 and 72–82, respectively.

It will be appreciated that other laminates can be formed using principles of the present invention for reinforcing other articles such as industrial belts and that a single ply of the present invention can be used with known or conventional plies to also form new useful reinforced composite structures.

Figure 3:
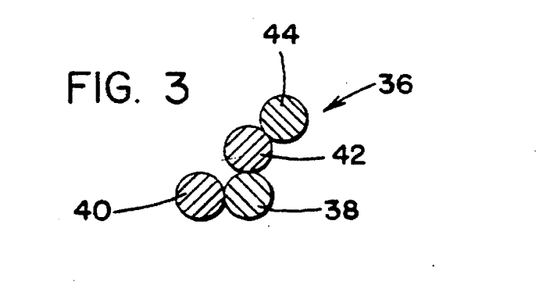
FIGS. 3–5 are cross sections through cords in accordance with an embodiment of the present invention.

Preferably the cords 36 are comprised of four filaments of finely drawn super tensile steel wire. As noted in the application incorporated by reference above, there are a number of metallurgical embodiments which result in the tensile strength defined above as super tensile (ST). Table I below gives calculated values of filament break load for super tensile filaments in comparison to previous high tensile filaments for various filament diameters. The first group being filaments which were made and the second group additional sizes identified as useful and to be made. In each case the super tensile gives a higher value.

TABLE 1

FILAMENT STRENGTH ANALYSIS

| FIL. DIA. | HT Brk Load | | ST Brk Load | |
|---|---|---|---|---|
| (MM) | Newtons | lbs | Newtons | lbs |
| .20 | 107 | (24.1) | 115 | (25.9) |
| .22 | 128 | (28.9) | 138 | (31.1) |
| .255 | 169 | (38.0) | 179 | (40.8) |
| .28 | 202 | (45.4) | 216 | (48.5) |
| .350 | 306 | (68.9) | 323 | (72.9) |
| .30 | 230 | (51.8) | 245 | (72.9) |
| .325 | 266 | (59.9) | 285 | (64.1) |
| .380 | 353 | (79.4) | 375 | (84.5) |

In addition to the determination of the above candidates to qualify for super tensile steels, it was also necessary to determine those which were further capable of long fatigue life, and more particularly those adaptable to tire cord filament. Super tensile candidates which qualified for strength did not always give long fatigue life. As a result, some candidates were found suitable, while others were not, and still others were preferred.

The cords 36 used in the working example have a structure of four filaments 38,40,42 and 44 of 0.35 mm diameter super tensile steel wire and a cord 36 break strength of 1308 Newtons plus or minus 96 Newtons. Each cord 36 has two filaments 38,40 twisted together with a 16 mm lay length and these two filaments 38,40 (designated the T group) are twisted at a 16 mm lay length together with the remaining two filaments 42,44 (designated the U group) which are untwisted and parallel to each other when twisted together with the twisted filaments 38,40 all in the same twist direction. This cord is designated generally as U+T type and wire specifically as 2+2×0.35 ST. The 2+2 construction is known for its openness and good rubber penetration resulting from the openness. The 0.35 designates the filament diameter in millimeters and the ST designates the material being super tensile.

Following are other embodiments of super tensile cord matched for comparison with the former tire cord which it replaced, some former cords of which are high tensile HT as well as normal tensile (NT) steel cords, the above example cord 36 being listed last:

| | Former Cord | | Super Tensile Cord | |
|---|---|---|---|---|
| | Structure | Dia. (MM) | Structure | Dia. (MM) |
| 1. | 3 × .25 NT | 0.50 | 3 × .20 | 0.40 |
| 2. | 3 × .265/9 × .245 HT | 1.02 | 3 + 2 × .35 | 1.10 |
| 3. | 5/8/14 × .22 NT | 1.32 | 3 + 3 × .35 | 1.10 |
| | 3 × .265/9 × .245 HT | 1.02 | 3 + 3 × .35 | 1.10 |
| 4. | 3 × .22/9 × .20 HT | 0.84 | 3 × .22/9 × .20 | 0.84 |
| 5. | 3 × .256/9 × .245 HT | 1.05 | 3 × .28/9 × .255 | 1.07 |
| 6. | 27 × .175 HT + 1 | 1.08 | 1 × .22/18 × .20 | 1.02 |
| 7. | 27 × .22 NT | 1.32 | 1 × .22/18 × .20 | 1.02 |
| 8. | 7 × 7 × .25 NT | 2.25 | 5/8/14 × .265 | 1.59 |
| 9. | 3 × .265/9 × .245 HT | 1.02 | 2 + 2 × .35 | 1.05 |

The illustrated example and candidates 1 to 3 above show a reduction in, to less than equal, cord diameter with the first mentioned five candidates, items 1–3 and 9, further being of a simpler construction, i.e., fewer filaments of open construction to enhance corrosion resistance in addition to reducing gauge material and cost with the previously noted smaller diameter cord making the tires lighter in weight and less costly. The balance of the candidates are of the bunched type structure, i.e., having a single twist in a single direction to form the cord.

Candidate 9 above had a comparable structure in a 2+2×0.30 HT cord tested for corrosion resistance in a road test against former structure 3×0.265/9×0.245+1. The test was a road test of 13R22.5 G144 truck tires with the top breakers of a four layer belt having the 2+2×0.30 HT cord at 16 EPI and the former structure 3×0.265/9×0.245+1 at 8 EPI. The mean propagation length for corrosion in the 2+2 reinforced tire was 1.9 cm, and for the 3×0.265/9×0.245+1 reinforced tire was 13.3 cm. The tires of each cord construction were cut at four positions to expose the wires of the top breakers to a salt bath. The test program details are a 6×4 truck was run at 40–75 kph under load of 3 tons/position with tire inflation of 8.25 bars. The distance run was 3408 to 3971 km with a salt bath dip per 11 km. These test results show 2+2×0.30 HT and U+T type construction to be corrosion resistant while the cord of the former structure 3×0.265/9×0.245+1 was not. This makes the U+T construction a candidate for top (1) and bottom (4) layers of a four layer belt.

Table 2, below, gives a direct comparison between a number of 4 filament cords of the U+T type of high tensile HT and super tensile ST of varying filament diameters showing an increase in strength in all cases. Note that not all the cord samples in Table 2 became candidates noted above.

TABLE 2

CORD STRENGTH
Strength in Newtons = Filament Break Load × Number Filaments × CE (.97)

| | HT Tensile of | | ST Tensile of | |
|---|---|---|---|---|
| CORD | Avg | Min | Avg | Min |
| 2 + 2 × .30 | 890 | 845 | 952 | 903 |
| 2 + 2 × .325 | 1032 | 979 | 1103 | 1050 |
| 2 + 2 × .35 | 1188 | 1125 | 1259 | 1188 |
| 2 + 2 × .38 | 1370 | 1303 | 1437 | 1388 |

Table 3 below again compares high tensile and super tensile cord samples of 3×0.22/9×0.20+1 and 3×0.26/9×245+1 construction for fatigue properties with super tensile again exceeding high tensile in a three roll fatigue test. The three roll fatigue test consists of three rolls on 1⅜" (34.9 MM) centers with 1 inch diameter pulleys, unless otherwise specified, cycled at 330 cycles per minute under a load which is 10% of cord breaking strength. The middle roll of the three rolls is offset from the remaining two rolls, and the cord, embedded in a strip of elastomer ¼"×½"×22" (6.35 MM×12.70 MM×558.8 MM), is passed under the two rolls and over the middle roll in each cycle to reverse the bending on the cord as it passes over the rolls.

While Table 3 data showed a 27% increase in fatigue over control, more recent testing shows 23% and 12% increases, the last value being unexpectedly low but with reasons undetermined; testing continues.

TABLE 3

FATIGUE EVALUATION
(Cycles to failure, three roll fatigue test with standard cradle and 1 inch pulley)

|  | 3 × 22/9 × .20 + 1 | 3 × .26/9 × .245 + 1 |
|---|---|---|
| High Tensile | 26584 | 9847 |
| Super Tensile |  |  |
| Sample A | 31615 | 11174 |
| Sample B | 33274 | 10901 |
| Sample C | 33875 | 10891 |

TABLE 4

BENCH SCALE FATIGUE EVALUATION
(Cycles to Failure, Three Roll fatigue test with standard cradle and varying pulley)

| Cradle/ | 2 × .30 Cord | |
|---|---|---|
| Pulley dia | Hi Tensile | Super Tensile |
| 1 in | 2430 | 2324 |
| .75 in | 3287 | 4337 |
| 1 in | 8349 | 13210 |
| 1.25 in | 29952 | 31312 |

Table 4 above compares high tensile and super tensile in a 2×0.30 cord where the fatigue test pulley diameter was varied to enhance the results and again shows a higher fatigue for the super tensile cord.

Figure 7:
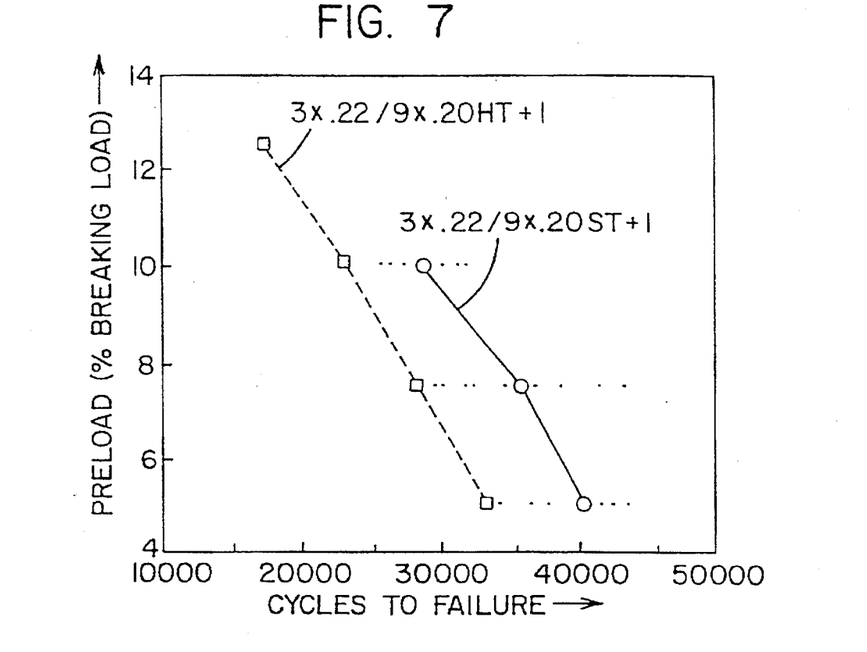
FIGS. 7 and 8 are graphs of fatigue characteristics of HT and ST Cords.
Figure 8:
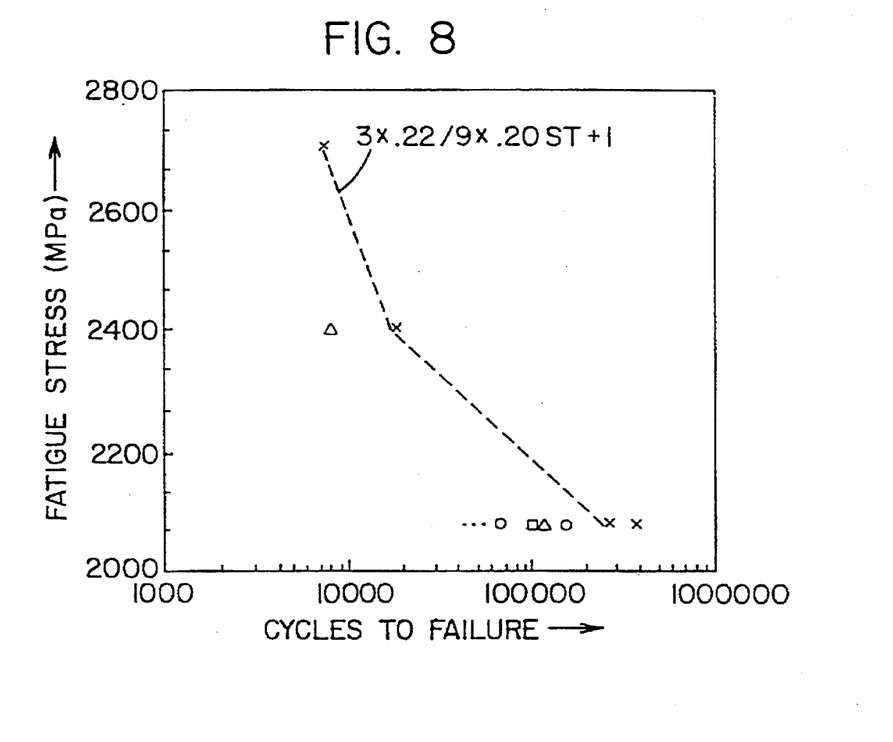

A further comparison of high tensile and super tensile cord is given graphically in FIG. 7, again using the three roll fatigue test, and FIG. 8 is a graph of the same super tensile cord, both graphs illustrating the higher fatigue properties of super tensile cord. This cord is found to be particularly applicable to tire sidewall ply reinforcement where the super tensile cord has permitted a reduction in end count (EPI) of 2 EPI in going from high tensile cord to super tensile with no other changes occurring in the ply or cord.

For equal filament diameters, the super tensile cords have higher strength and fatigue life over predecessor high tensile cords, and the cord candidates in the list following Table 1 also have their filaments all twisted in the same direction with the same lay length to accommodate single twist operations. These advantages lead to elastomer products which have less reinforcement material and thus lower weight and cost. Further the life of the product can be increased with the increase in fatigue life of the cord and its filaments.

As noted above, a major variant which may be varied in a reinforced composite of elastomer is the end count, or EPI (end per inch), which is the number of cords per unit length in the lateral direction to the direction in which the elastomer is being reinforced. Table 7 below lists samples of high tensile and possible super tensile candidates showing the general increase in rivet as the increased strength of the super tensile samples allowed a reduction in EPI. At the other extreme, as cord diameter is reduced and end count increased to offset it, the rivet is reduced as for Load Range H. Generally a minimum rivet of 0.018" must be maintained to give proper penetration of elastomers between cords when they are so embedded. This minimum rivet is particularly obtainable with the smaller diameter and simpler (less filaments in a cord) cord construction.

TABLE 7

TENSILE COMPARISON

| Load Range | Cords | EPI | Rivet |
|---|---|---|---|
|  | High Tensile |  |  |
| F/G | 3 × .22/9 × .20 + 1 HT | 16 | 0.70 |
| H | 27 × .175 + 1 HT | 11 | 1.23 |
| J | 27 × .175 + 1 HT | 15 | 0.61 |
|  | Super Tensile |  |  |
| F/G | 3 × .22/9 × 20 + 1 | 14 | 0.93 |
| H | 3 × .22/9 × .20 + 1 | 16 | 0.70 |
| J | 1 × .22/18 × .20 + 1 | 16 | 1.09 |

The same considerations which exist for a single layer or ply above also exist for multi layer and/or belt constructions as depicted in Tables 8 and 9 below.

TABLE 8

RMT BELTS (LRG)

|  |  | Super Tensile | |
|---|---|---|---|
|  | HIGH TENSILE | 2 + 2 × .35 EPI | 3 + 2 × .35 EPI |
| Layer 1 | 3 × .22/9 × .20 + 1    14 EPI | 13 | 10 |
| Layer 2 | 3 × .265/9 × .245 + 1   12 | 17.5 | 14 |
| Layer 3 | 3 × .265/9 × .245 + 1   12 | 17.5 | 14 |
| Layer 4 | 3 × .265/9 × .245 + 1   08 | 13 | 10 |

TABLE 9

BELT STRENGTH ANALYSIS (LRG)

|  | Construction | EPI | Lbs/Inch |
|---|---|---|---|
| Layer 1 | 3 × .22/9 × .20 k + 1 HT | 14 | 3780 |
| Layer 2 | 3 × .265/9 × .245 + 1 HT | 12 | 4608 |
| Layer 3 | 3 × .265/9 × .245 + 1 HT | 12 | 4608 |
| Layer 4 | 3 × .265/9 × .245 + 1 HT | 08 | 3072 |

Table 8 compares a prior high tensile belt of four layers with two candidates of super tensile with comparable strength in radial medium truck tire belts of a load range G. The cords are from the preferred group identified above. Generally it can be observed that the smaller diameter super tensile cord requires more EPI, but not for the first layer which requires less because of the offset of the larger diameter filaments. Table 9 is a strength analysis for the prior high tensile belt of Table 8.

Table 10 gives a test sample tire belt and ply construction of super tensile material and two additional candidates. The satisfactory results of the test sample indicated improved rolling resistance and that super tensile could be used in all load ranges by varying the end count (EPI). Each of the reinforcement packages resulted in the listed belt inch strengths.

TABLE 10

INCH STRENGTH

| BELT LAYER | CORDS | EPI | In Str |
|---|---|---|---|
| | Test Sample (11R24.5 G167 Truck Tire LRG) | | |
| 1 | 3 × .22/9 × .20 + 1 | 14 | 3780 |
| 2 | 3 × .28/9 × .255 | 12 | 5296 |
| 3 | 3 × .28/9 × .255 | 12 | 2596 |
| 4 | 3 × .28/9 × .255 | 8 | 3528 |
| Ply | 3 × .22/9 × .20 ST + 1 | 14 | — |
| | Candidate 1 | | |
| 1 | 2 + 2 × .35 | 13 | 3290 |
| 2 | 2 + 2 × .35 | 17.5 | 4690 |
| 3 | 2 + 2 × .35 | 17.5 | 4690 |
| 4 | 2 + 2 × .35 | 13 | 3290 |
| | Candidate 2 | | |
| 1 | 3 + 2 × .35 | 10 | 3360 |
| 2 | 3 + 2 × .35 | 14 | 4704 |
| 3 | 3 + 2 × .35 | 14 | 4704 |
| 4 | 3 + 2 × .35 | 10 | 3360 |

More particularly, the value of the above type constructions are also seen as applicable to and useful for light truck tires in load ranges E/F where belts of two layers are preferred as illustrated in FIG. 4 with 2+2×0.35 ST cords at 6.9 ends per centimeter (17.5 EPI) with the angle θ of one layer being approximately 19½° and the other ply having an identical but opposing angle. Another construction would be 3+2×0.35 ST cords at 5.5 ends per centimeter (14 EPI) and the same angle as the first light truck tire example including two opposing layers. These constructions would replace a current construction of 3×0.265/9×0.245 HT+1 at 4.7 and 5.5 ends per centimeter (12 and 14 EPI). The above tire selections came only after extensive study and testing which included the lab test results in Table 11 below.

TABLE 11

TEST TIRE RESULTS
(11R24.5 G167A Truck Tire LRG)

| | Control | |
|---|---|---|
| Component | Cord | EPI |
| Belt 1 | 3 × .22/9 × .20 HT + 1 | 14 |
| Belt 2 | 3 × .265/9 × .245 HT + 1 | 12 |
| Belt 3 | 3 × .265/9 × .245 HT + 1 | 12 |
| Belt 4 | 3 × .265/9 × .245 HT + 1 | 8 |
| Ply | 3 × .22/9 × .20 HT + 1 | 16 |

| Test | Data | |
|---|---|---|
| Rolling Resistance | 34.2 lbs | |
| Smooth Wheel Duration | 17041 | F bes |
| Bead Duration | 4351 | F pes |
| | 7012 | F fl ck |
| ODR | 56788 | F pes |
| | 58231 | F pes |

SUPER TENSILE

| Component | Cord | EPI |
|---|---|---|
| Belt 1 | 3 × .22/9 × .20 + 1 | 14 |
| Belt 2 | 3 × .28/9 × .255 | 12 |
| Belt 3 | 3 × .28/9 × .255 | 12 |
| Belt 4 | 3 × .28/9 × .255 | 8 |
| Ply | 3 × .22/9 × .20 + 1 | 14 |

| Test | Data | |
|---|---|---|
| Rolling Resistance | 33.5 lbs | |
| Smooth Wheel Duration | 13065 | F bes |
| | 17979 | F bes |
| Bead Duration | 13532 | F pes |
| | 13022 | F pes |
| ODR | 65315 | F |
| | 67787 | F 3rd bes |
| Treadwear | 142K | S/F & retrd |
| Treadwear Rating | 97 | |

TABLE 12

CORD SPACING (LRH)

| BELT LAYER | CORDS | EPI |
|---|---|---|
| | Control | |
| 1 | 3 × .22/9 × .20 + 1 HT | 12 |
| 2 | 3 × .265/9 × .245 + 1 HT | 16 |
| 3 | 3 × .265/9 × .245 + 1 HT | 16 |
| 4 | 3 × .265/9 × .245 + 1 HT | 8 |
| | Super Tensile | |
| 1 | 3 × .22/9 × 20 + 1 ST | 12 |
| 2 | 3 × .28/9 × .255 + 1 ST | 14 |
| 3 | 3 × .28/9 × .255 + 1 ST | 14 |
| 4 | 3 × .28/9 × .255 + 1 ST | 8 |
| | Candidate 1 | |
| 1 | 2 + 2 × .35 | 13 |
| 2 | 3 + 3 × .35 | 16 |
| 3 | 3 + 3 × .35 | 16 |
| 4 | 2 + 2 × .35 | 13 |

TABLE 13

CORD SPACING (LRJ)

| BELT LAYER | CORDS | EPI |
|---|---|---|
| | Control | |
| 1 | 27 × .175 + 1 HT | 11 |
| 2 | 5/8/14 × .22 + 1 HT | 12 |
| 3 | 5/8/14 × .22 + 1 HT | 12 |
| 4 | 3 × .265/9 × .245 + 1 HT | 8 |
| | Super Tensile | |
| 1 | 3 × .22/9 × .20 + 1 | 12 |
| 2 | 3 × .28/9 × .255 + 1 | 16 |
| 3 | 3 × .28/9 × .255 + 1 | 16 |
| 4 | 3 × .28/9 × .255 + 1 | 8 |
| | Candidate 1 | |
| 1 | 2 + 2 × .35 | 17 |
| 2 | 3 + 3 × .35 | 16 |
| 3 | 3 + 3 × .35 | 16 |
| 4 | 2 + 2 × .35 | 17 |

Comparing the control structures for belts in Tables 11-13 above with those for super tensile (ST), it can be noted that the control structure for Load Range J could not be achieved by increasing the end count alone. It was necessary for belt layers 2 and 3 to be increased in reinforcement cord size by changing from the 12× type cord to the 5/8/14×0.22+1 HT indicated. With the use of super tensile cord, the 12× type cord can accommodate the entire load range even though two cord filament sizes are used, nominally 0.20 mm and 0.25 mm for 3×0.22/9×0.20+1 and 3×0.28/9×0.255+1, respectively. For the U+T type cord in Tables 8-11 a further benefit can be observed in that a single filament size, 0.35 mm diameter, accommodates the Load Ranges from G through J. It will be appreciated that in processing and manufacturing, cost and time are saved when there are fewer components to handle whether it be fewer types of cord to make up composites or fewer filament diameters to make up cord.

Further testing has occurred over that given in Table 11 above with 295/75R22.5 G159 radial medium truck tires. These tires had the U+T type construction and exemplified similar results to those of Table 11 but were found equal to control for rolling resistance as compared to the increase noted for Table 11.

Using, again, the 11R24.5 G167A truck tire, Load Range G, this tire has a four layer belt as depicted in Tables 14 and 15 below for a prior belt and a super tensile belt, respectively together with a weight analysis. The reduction in weight of both cord and cord rubber of 4.7% results in a savings per tire in material alone of 25%.

TABLE 14

WEIGHT & COST ANALYSIS
PRIOR BELT PACKAGE
(11R24.5 G167 TRUCK TIRE LRG)

| | Construction | EPI | Treatment Weight (Lbs) | |
| --- | --- | --- | --- | --- |
| | | | Rubber | Wire |
| Layer 1 | 3 × .22/9 × .20 + 1 | 14 | 1.19 | 1.26 |
| Layer 2 | 3 × .265/9 × .245 + 1 | 12 | 2.70 | 3.05 |
| Layer 3 | 3 × .265/9 × .245 + 1 | 12 | 2.44 | 2.76 |
| Layer 4 | 3 × .265/9 × .245 + 1 | 08 | 1.16 | 1.08 |
| | | Total | 7.49 | 8.15 |
| | | | 15.64 Lbs | |

TABLE 15

| | Construction | EPI | Treatment Weight (Lbs) | |
| --- | --- | --- | --- | --- |
| | | | Rubber | Wire |
| WEIGHT ANALYSIS BELT PACKAGE WITH LRG 2 + 2 × .35 (11R24.5 G167 TRUCK TIRE | | | | |
| Layer 1 | 2 + 2 × .35 | 13 | 1.38 | 1.14 |
| Layer 2 | 2 + 2 × .35 | 17.5 | 2.50 | 2.76 |
| Layer 3 | 2 + 2 × .35 | 17.5 | 2.25 | 2.49 |
| Layer 4 | 2 + 2 × .35 | 13 | 1.46 | 1.08 |
| | | Total | 7.59 | 7.47 |
| | | | 15.06 Lbs | |

TABLE 15-continued

| | Construction | EPI | Treatment Weight (Lbs) | |
| --- | --- | --- | --- | --- |
| | | | Rubber | Wire |
| WEIGHT ANALYSIS BELT PACKAGE WITH LRG 3 + 2 × .35 (11R24.5 G167 TRUCK TIRE | | | | |
| Layer 1 | 3 + 2 × .35 | 10 | 1.46 | 1.09 |
| Layer 2 | 3 + 2 × .35 | 14 | 2.62 | 2.76 |
| Layer 3 | 3 + 2 × .35 | 14 | 2.37 | 2.49 |
| Layer 4 | 3 + 2 × .35 | 10 | 1.53 | 1.04 |
| | | Total | 7.98 | 7.38 |
| | | | 15.36 Lbs | |

It has been observed for Load Range G the belt structure for an 11R24.5 G167A truck tire with the above 2+2×0.35 ST reinforcement has a stiffness of 36 Newtons/MM on a laboratory 3 point bending, i.e., knife edge ends center impingement, stiffness test as compared to 28 Newtons/MM for its predecessor, 3×0.265/9×0.245 HT+1 at 12 EPI on the same test. This is a ratio of 1.29 of the new belt stiffness over the old (control). While not proven, theoretically the belt stiffness is responsible for, or at least contributes to, the improvement in rolling resistance. Testing continues with further candidates in off-the-road tires such as 5/8/14×0.265 ST+1 in the carcass and belts of 1800R33RL4J through 3600R51 size tires. Data is slow coming back on these large tires.

In accordance with the provisions of the patent statutes, the principle and mode of operation of the tire have been explained and what is considered to be its best embodiment has been illustrated and described. It should, however, be understood that the invention may be practiced otherwise than as specifically illustrated and described without departing from its spirit and scope.

We claim:

1. A reinforced layer of elastomer for reinforcement of elastomeric articles having at least one layer of cord spaced in a direction lateral to the direction of reinforcement, each cord having a diameter in the range of 0.30 mm to 1.6 mm and formed in a single step where all its filaments have the same lay direction, each cord made of steel having at least a cord break load (CBL) defined by the expression:

$$CBL = N(720.4D^2 - 352.6D^3)CE$$

where CE is the cord efficiency, D is the filament diameter in MM and N is the number of filaments in each cord.

2. The reinforced layer of elastomer in claim 1 wherein the filament diameter is 0.35 and N is 4 to 6.

3. The reinforced layer of elastomer in claim 1 wherein the cord construction is 2+2×0.35.

4. The reinforced layer of elastomer in claim 1 wherein the cord construction is 3+2×0.35.

5. The reinforced layer of elastomer in claim 1 wherein the cord construction is 3+3×0.35.

* * * * *